Figure 6:
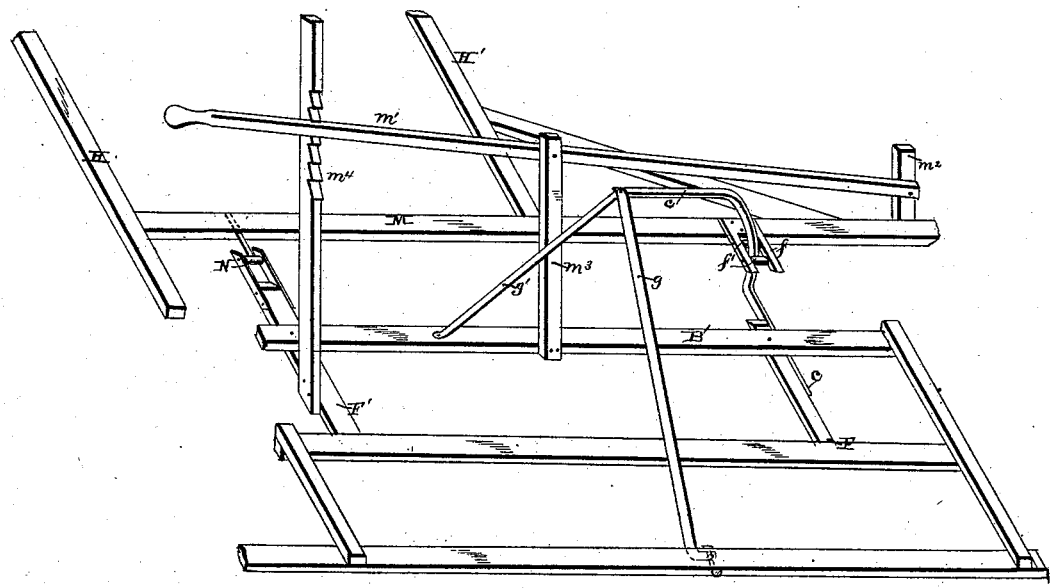

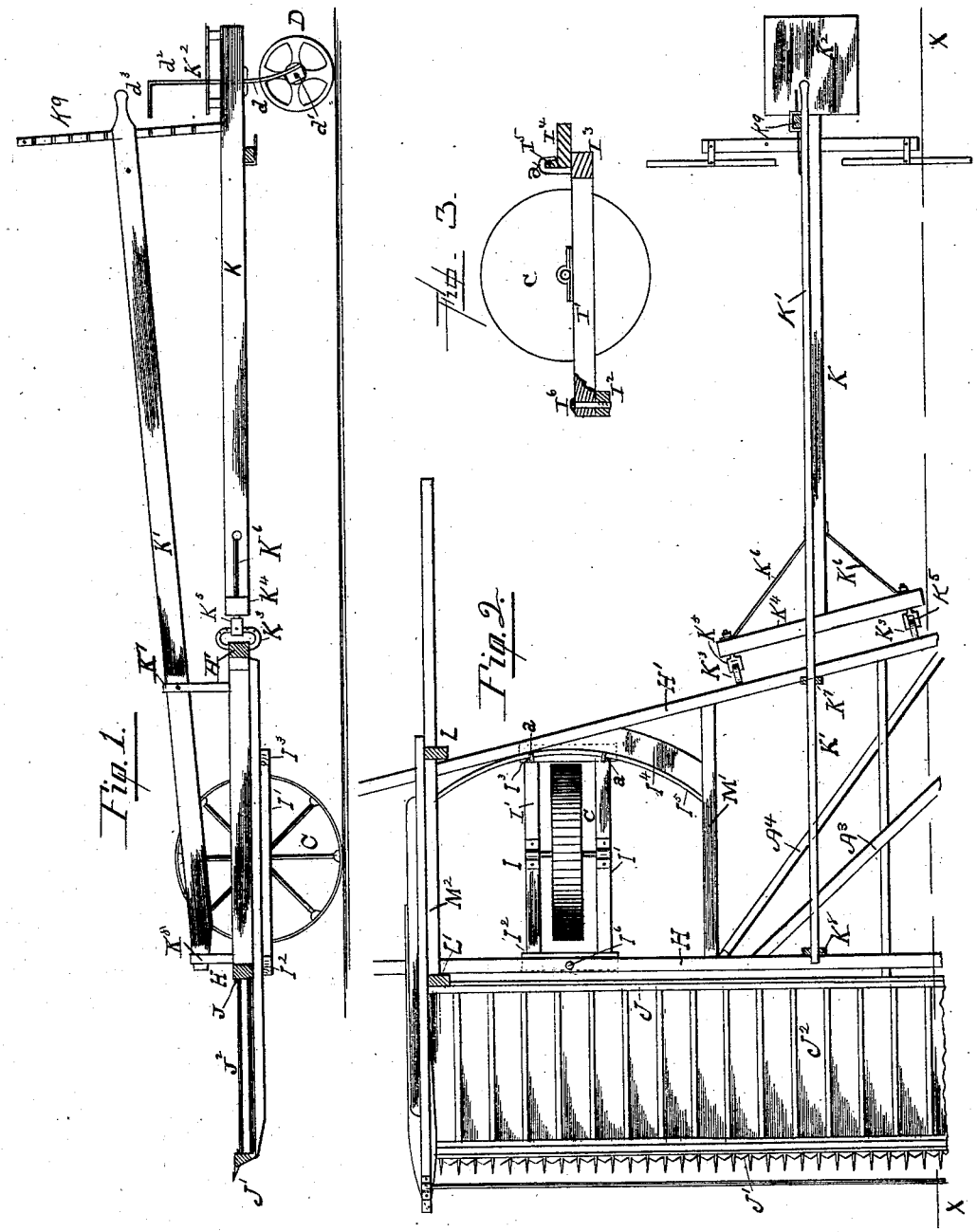

(No Model.) 3 Sheets—Sheet 2.
J. MINGES.
COMBINED HEADER AND THRASHER.
No. 393,847. Patented Dec. 4, 1888.
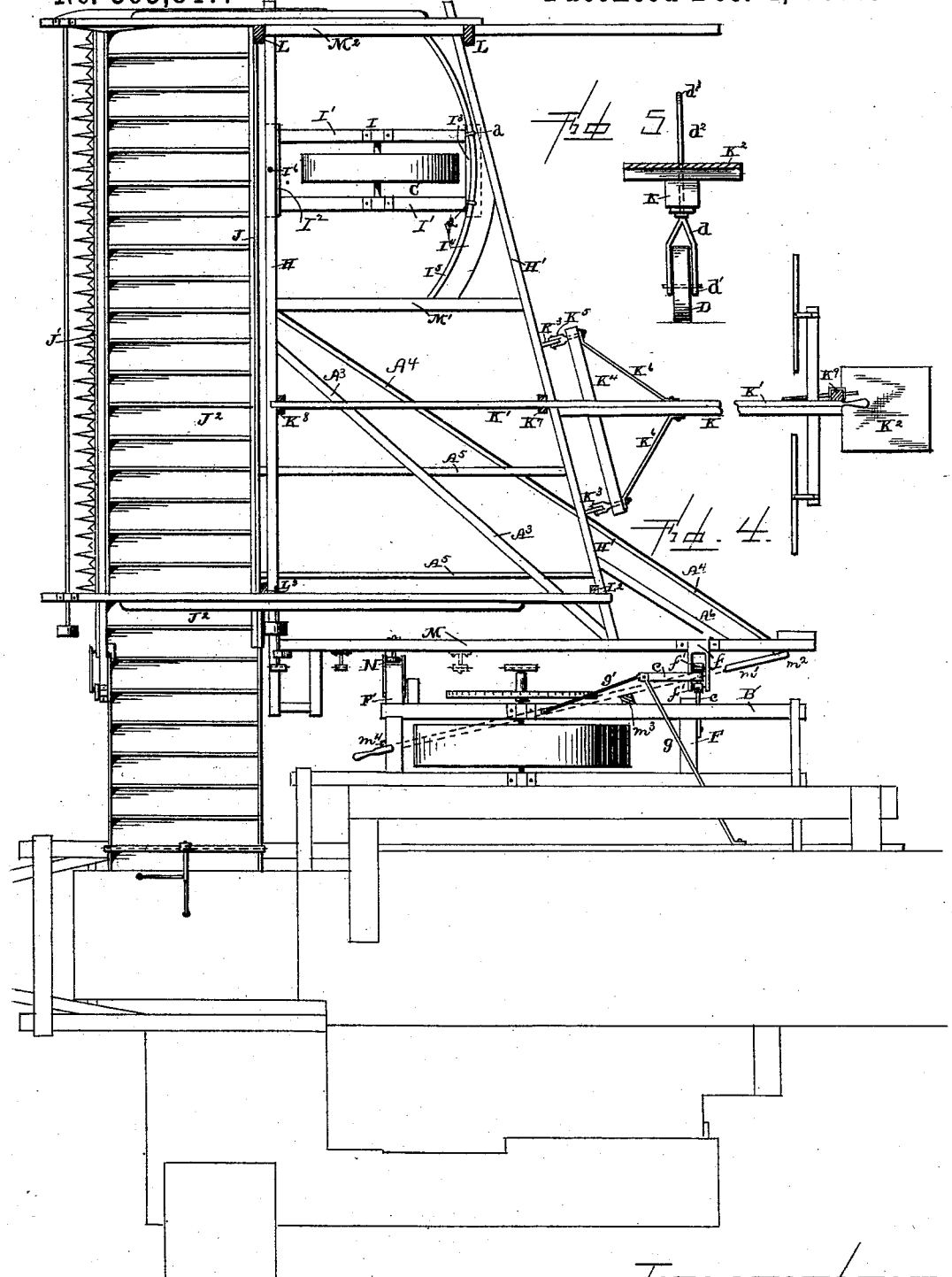

(No Model.) 3 Sheets—Sheet 3.

J. MINGES.
COMBINED HEADER AND THRASHER.

No. 393,847. Patented Dec. 4, 1888.

UNITED STATES PATENT OFFICE.

JOHN MINGES, OF ATLANTA, ASSIGNOR TO THE STOCKTON COMBINED HARVESTER AND AGRICULTURAL WORKS, OF STOCKTON, CALIFORNIA.

COMBINED HEADER AND THRASHER.

SPECIFICATION forming part of Letters Patent No. 393,847, dated December 4, 1888.

Application filed August 11, 1885. Serial No. 174,099. (No model.)

*To all whom it may concern:*

Be it known that I, JOHN MINGES, a citizen of the United States, residing at Atlanta, in the county of San Joaquin and State of California, have invented certain new and useful Improvements in Harvesters, of which the following is a specification, reference being had therein to the accompanying drawings.

My invention relates to an improvement in combined headers and thrashers; and it consists in the combination of the parts hereinafter more fully described, and pointed out in the claims.

The objects of my invention are to pivotally connect the thrasher-frame and the header-frame together, so as to allow them to vibrate independently of each other when passing over uneven surfaces, and thus prevent the continued strain that necessarily exists when the two are rigidly connected together, to so construct the header-frame as to make it compact and rigid at those points where the most strain occurs, and by this construction permit the pushing-pole to be attached nearer the thrasher-frame than could otherwise be, and thus lessen the side draft, which necessarily exists when the pushing-pole is placed at the center of the header-frame, and at the same time secure the braces which prevent lateral movement of the pushing-pole to an inclined or diagonal beam, which adds to the rigidity of the header-frame, and to swivel the frame in which the header-supporting wheel is journaled, so as to allow the wheel and its frame to freely oscillate when the machine is being turned out of a straight line.

Figure 1 is a side elevation of the header-frame embodying my invention. Fig. 2 is a plan view of the same, partly broken away. Fig. 3 is a detail view of the header-supporting wheel and its frame, the latter being shown in section. Fig. 4 is a plan view of the header and thrasher frames connected, the thrasher-frame shown only in general outlines. Fig. 5 is a detail rear elevation of the wheel D, its bearings, the pushing-pole K, and the platform $K^2$. Fig. 6 is an enlarged detail perspective showing the adjoining beams of the header and thrasher frames, the auxiliary lever, and the devices for pivotally connecting the two beams together.

The header-frame consists of the two side horizontal beams, M $M^2$, and the transverse horizontal beam H, which connects the front ends of the two side beams together. Connected to the inner beam, M, near its rear end, and extending diagonally forward and outward, is the horizontal beam H', which has its opposite end connected to the outer beam, $M^2$, forward of the connecting-point of the beam H' to the beam M. This diagonal horizontal beam H' forms the rear part of the header-frame. The beams H H' are connected together between the beams M $M^2$ by means of the horizontal beam M' and a suitable number of strengthening-beams, $A^5$, between the beams M' and M. Connected to the beams H and M are the diagonal strengthening-bars $A^3$ and $A^4$, and connected to the beams H' and M in the rear of the diagonal beam H' is the short diagonal strengthening-bar $A^6$.

The object of making the beam H' diagonal is to make the header-frame more compact, and consequently more rigid, the beam H' acting as a strengthener or brace to that part of the header-frame where the swinging supporting-wheel C and the curved supporting-bar $I^4$ are located. If the end of the beam H' to which the curved supporting-bar $I^4$ is secured was attached nearer the rear end of the beam M, the frame of the wheel C would have to be lengthened out to reach the supporting-bar $I^4$, and the whole frame of the header would be weakened and the oscillation of the rear end of the swinging wheel-frame would be correspondingly greater, thus increasing the friction. The beam H' being diagonal its entire distance across the rear part of the header-frame, it also lessens the side draft, for the reason that the pushing-pole K may be placed nearer the inner side beam, M, whereby a great side pressure upon the wheel C is prevented, allowing it to run lightly over the ground and not cut into it, as is usually the case, and thus preventing it from having a free oscillating or swinging movement.

For the purpose of allowing a free and independent movement of the header and thrasher frames, respectively, when passing over uneven ground the inner side beam, M, of the header-frame is loosely connected to the laterally projecting beams F F' of the thrasher-frame. The front beam, F', of the thrasher-frame is connected to the beam M of the header by means of the T-shaped pivotal bolt N, having its horizontal cross portion journaled in the line of draft between brackets fastened to the end of the beam F' and its opposite end journaled at right angles thereto in the beam M. By this simple device the header-frame at this point is allowed two movements, one at right angles to the other. The rear beam, F, of the thrasher-frame is loosely connected to the beam M of the header by means of the curved standard $c$, which has its lower end bent horizontally and secured to the beam F of the thrasher-frame. The upright portion of this standard forms the segment of a circle, having the front pivotal connection between the frames formed by the neck of the pivotal bolt N as a center, and this segmental or curved portion passes through the jaws of the bracket-casting $f$, having rollers $f'$ for each side of the standard $c$ to bear against. This standard is supported and braced at its upper end by means of the braces $g$ $g'$, attached at their lower ends to the thrasher-frame. The above-described devices are not only simple and durable, but are easily handled, the roller $f'$ practically preventing any friction at the points of contact with the standard $c$ as the rear end of the header-frame is raised or lowered by means of the main operating-lever K' and the auxiliary lever $m'$ for the purpose of regulating the distance of the cutter-bar J' from the surface of the ground. By this construction of the means of attachment of the rear beam, F, of the thrasher-frame to the inner side beam, M, of the header-frame, as above described, the rear end of the header-frame is allowed a free vertical adjustment for the purpose of regulating the distance of the cutter-bar J' from the ground, and while held in this adjustment is allowed to freely vibrate vertically at its outer side independent of the thrasher-frame as it passes over uneven surfaces by means of the cross part of the pivot-bolt N, which is journaled, as before stated, in brackets secured to the beam F' of the thrasher-frame. When the inner side of the header-frame rocks on the pivotal bolt N, the outer side of said frame rocks upon the axle of the header-supporting wheel C, and to permit this the axis of the bolt and wheel must be in approximately the same line.

The conveyer $J^2$ is of the ordinary construction and is mounted in the header-frame at the rear of the cutter-bar J', and conveys the grain as rapidly as cut to the thrashing-machine.

Swiveled at the front end of the horizontal beam H by means of the pivot or bolt $I^6$ is the rectangular header-supporting wheel-frame I, in which the supporting-wheel C is journaled. The rectangular wheel-frame I consists of the side bars, I', and the front and rear end bars, $I^2$ $I^3$. The curved bar $I^4$ has one end secured to the beam M', its center to the diagonal beam H', and its opposite end to both the beams H' and $M^2$ at their point of connection, and forms a part of a circle described by taking the point $I^6$ as a center. Secured to the forward edge of this curved bar $I^4$ is the vertical flange or track $I^5$, with which the supports or guides $a$, secured upon the rear end of the wheel-frame I, engage. By means of this swivel-wheel O the header-frame will freely follow the thrasher in turning.

The pushing-pole K has secured to its front end the diagonal bar $K^4$, which is parallel with the diagonal beam H' and is braced by means of the oblique bars $K^6$. Secured to opposite ends of the bar $K^4$ are the lugs or ears $K^5$, pivoted to the perforated clevises $K^3$, which are secured to the diagonal beam H'. This construction allows the vertical adjustment of the pushing-pole K in relation to the header-frame as may be desired. The lever K' has its forward end loosely attached to the vertical post $K^8$, which is secured to the horizontal beam H. The lever is pivoted to the vertical post $K^7$, rising from the rear part of the header-frame, and its rear end extends backward over the pole K and engages the notched or serrated vertical rack $K^9$, mounted on the tongue. By this means the front end of the header-frame is raised or lowered and held in any desired relation to the ground. Placed upon the rear end of the pushing-pole K is the platform $K^2$, upon which the driver stands in easy reach of the lever K'. The pushing-pole K is supported at its rear end by means of the swiveled wheel D, which has its journal-bearings in the boxes $d'$, secured to the arms $d$ of the bifurcated standard $d^2$, which is journaled in the rear end of the pole K, and, extending upward a suitable distance, is provided with a handle, $d^3$, by means of which the wheel is turned, so as to guide the machine.

For the purpose of assisting in the raising and lowering of the front end of the header-frame an auxiliary lever, $m'$, has its rear end pivoted to the post $m^2$, fastened to and rising from the rear end of the inner beam, M, of the header, so as to allow a free vertical movement, and is fulcrumed near its center to the vertical post $m^3$, secured to the thrasher-frame, and its front end made to engage the vertical notched post $m^4$, which has its lower end secured to the beam F' inside of the beam B'. It will be readily understood that by moving the forward end of the lever $m'$ up or down it will raise or lower the rear end of the header-frame upon the neck of the pivotal bolt N, which forms the pivotal point of the header-frame.

The header-frame being attached to the thrasher-frame in the manner herein described, its vertical movement for the purpose of raising or lowering its forward end in relation to the ground is upon the neck of the pivotal bolt N, which is secured to the horizontal beam M, while its vertical vibratory movement independent of the thrasher-frame to allow it to follow the unevenness of the ground is upon the cross-piece of the pivotal bolt N, which is journaled in the brackets secured to the beam F', while the device described for attaching the beam F to the rear end of the header-frame allows these two movements to be freely made, and yet secure the rear end of the header and the thrasher durably and efficiently together.

Having thus described my invention, I claim—

1. In a header-frame, the combination of the horizontal side beams, M M², the beam H', extending diagonally across the entire rear part of the frame and connecting at opposite ends with the side beams, the pushing-pole provided at its rear end with the supporting-wheel D and having its forward end connected to the diagonal beam H' inside of its center, the diagonal cross-piece K⁴, rigidly connected to the pushing-pole at its forward end and extending parallel with the diagonal beam, the ends of the pieces K⁴ being secured to the diagonal beam, the wheel C, journaled in a swinging frame, and the thrasher-frame, all combined substantially as and for the purpose set forth.

2. In a combined header and thrasher, the combination of the thrasher-frame, the header-frame, the pivotal bolt N, by which the latter is hinged to the former, the supporting-wheel C, having its axis approximately in a line with the bolt N, the casting $f$, secured to the header, curved standard C, mounted on the thrasher which passes through the casting $f$, the tongue K, pivoted to the header, the lever K', for raising the front end of the header, and the auxiliary lever $m'$, mounted on the thrasher and having its rear end connected to the rear inner side of the header-frame and its forward operating end suitably held in the adjusted position, for the purpose substantially as shown and described.

In testimony whereof I affix my signature in presence of two witnesses.

JOHN MINGES.

Witnesses:
 JOSHUA B. WEBSTER,
 HENRY MINGES.